United States Patent [19]

Linford et al.

[11] 4,209,689

[45] Jun. 24, 1980

[54] LASER SECURE COMMUNICATIONS SYSTEM

[75] Inventors: Gary J. Linford, Gardena; Eugene R. Peressini, Torrance; Walter R. Sooy, Manhattan Beach, all of Calif.

[73] Assignee: Hughes Aircraft Company, Culver City, Calif.

[21] Appl. No.: 831,276

[22] Filed: Jun. 4, 1969

[51] Int. Cl.² ........................... H04B 9/00; H01S 3/00
[52] U.S. Cl. .................................... 455/609; 330/4.3; 331/94.5 C; 331/94.5 M
[58] Field of Search ........... 331/94 S, 94.5 M, 94.5 C; 250/199; 332/7.51; 330/4.3

[56] References Cited

U.S. PATENT DOCUMENTS

| 3,215,842 | 11/1965 | Thomas | 250/199 |
| 3,395,608 | 8/1968 | Neill | 88/14 |

Primary Examiner—S. C. Buczinski
Attorney, Agent, or Firm—Don O. Dennison; W. H. MacAllister

[57] ABSTRACT

A laser secure communications system is disclosed. The system utilizes a long laser cavity, the end reflecting members of which may be located many kilometers apart. One or more high gain laser amplifiers optically aligned within the long laser cavity provide the optical carrier energy. Laser oscillation only occurs if the remotely located end reflectors are optically aligned and if the laser gain is sufficient to overcome the round trip transmission loss. The optical carrier thus established is modulated and detected at either end of the laser cavity.

7 Claims, 3 Drawing Figures

LASER SECURE COMMUNICATIONS SYSTEM

FIELD OF THE INVENTION

This invention relates to communications systems and more specifically to communications systems using lasers as the source of electromagnetic wave energy. The invention herein described was made in the course of or under a contract or subcontract thereunder, with the Department of the Army.

DESCRIPTION OF THE PRIOR ART

In the past many types of communications systems have been suggested, using the coherent output of laser oscillators as the information center. Such systems have dealt primarily with problems relating to modulating, detecting and directing the laser beams. These systems, however, share a common operating principle which is somewhat undesirable for secure communication links.

The prior art laser communications systems utilize a laser oscillator structure comprising, in its simplest form, an active laser medium disposed within a relatively short resonant optical cavity. The term "relatively short" as used herein refers to cavity lengths on the order of the length of the active laser medium. The output light beam from the laser oscillator is somehow modulated and the modulated beam is then transmitted. Conventional telescopes or other collimating means have been employed to further concentrate the already narrow modulated beam and direct it to the receiving station.

Due to the narrow spatial beamwidth of the resulting radiation, some degree of security from unwanted detection is naturally obtained. However, these systems have at least two drawbacks which detract from their full usefulness in highly secure applications. First, the initial alignment of the transmitting beam with the remote receiver can be somewhat time-consuming and, secondly, after alignment of the transmitting and receiving stations has been achieved it is still possible for a "snooper" to intercept the transmitted beam.

It is therefore an object of the present invention to improve the security of laser communications systems.

It is a further object of the present invention to provide a secure laser communications system wherein the remote receiver comprises a portion of a single long laser cavity.

It is yet another object of the present invention to provide a laser communications system which, over a limited angle, is self-aligning.

SUMMARY OF THE INVENTION

In keeping with the principles of the present invention these objects are accomplished by means of a single long laser cavity, the end reflecting members of which are remotely located. In a preferred embodiment a high gain laser amplifier and a first retrodirective reflecting member are located at the transmitting station. At the remote receiving station there is disposed a second retrodirective reflector. The two retrodirective reflectors, or retroreflectors as they are commonly termed, when optically aligned, provide a feed-back path for the laser amplifier. If sufficient gain is present to overcome the round trip transmission loss, laser oscillation occurs. Means are provided at both the transmitting and receiving locations to modulate the energy circulating in the cavity. Detector means are also provided at each of the end retroreflectors for demodulation purposes.

Small, portable, lightweight receiving apparatus can be employed for field use. Alternatively, long range communications can be achieved by means of plural high gain laser amplifiers located coaxially within the long laser cavity between the transmitting and receiving locations.

As mentioned hereinabove, one of the features of the present invention resides in the fact that the remote receiver, utilizing a retroreflector, forms a necessary part of the feedback path. If the receiving retroreflector is not present with the solid angle field of view of the transmitting station, no laser oscillation takes place. Furthermore, any foreign object inserted into the optical transmission path between the transmitting and receiving retroreflectors will cause the laser oscillations to cease. This is unlike prior art systems which generate a continuous laser beam or series of laser pulses and which can be readily detected by an observer using either visible or infrared detection techniques. The only time laser oscillation takes place in accordance with the present invention is when the receiving retroreflector is present and aligned. Even then, however, the solid angle occupied by the light beam is reduced to a minimum.

BRIEF DESCRIPTION OF THE DRAWINGS

In order that the invention may be clearly understood and readily carried into effect, it will now be described with reference by way of example to the accompanying drawings, in which.

DESCRIPTION OF THE PREFERRED EMBODIMENT

Figure 1:
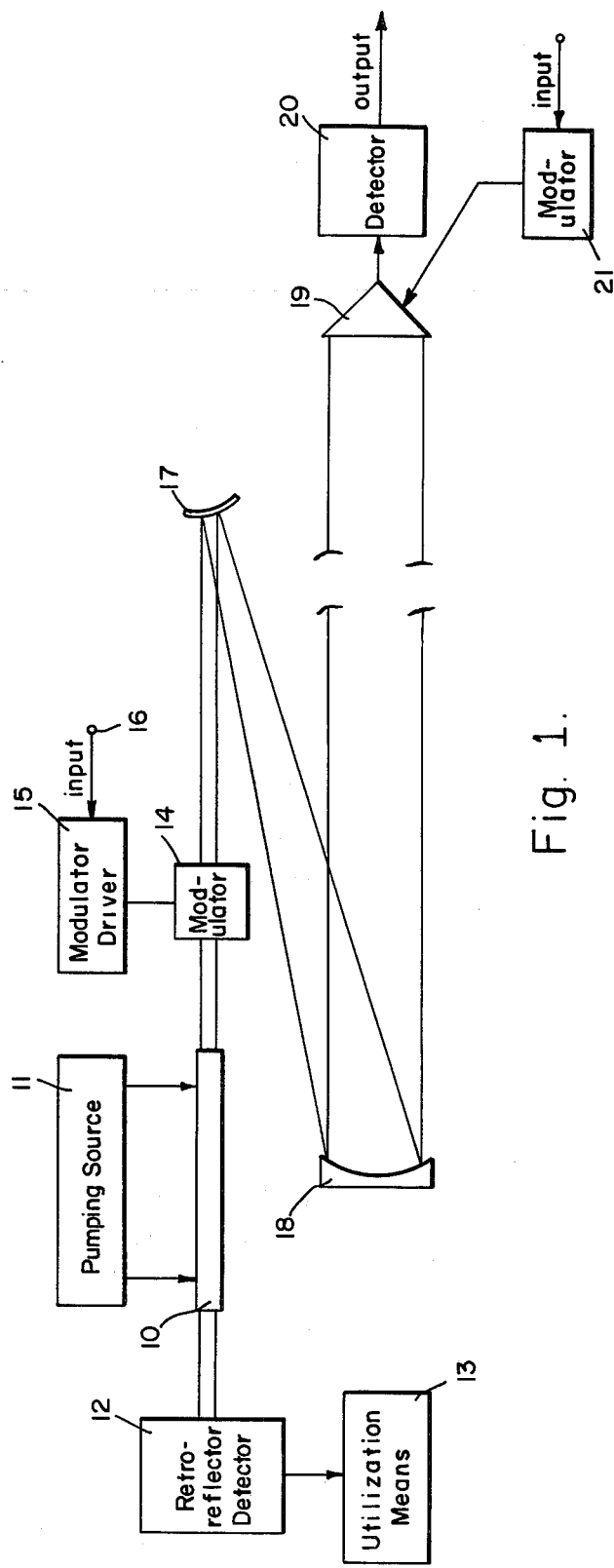
FIG. 1 is a block diagram of a first embodiment of the present invention primarily adapted for field use.

Referring more specifically to the drawings, FIG. 1 is a block diagram of one embodiment of the present invention. In FIG. 1 there is shown a high gain laser amplifier 10 which can comprise, for example, an elongated glass envelope containing the active laser medium. A pumping source 11 is provided which, for this example, establishes an electrical discharge within the active laser medium to produce a metastable energy level population inversion therein.

A composite retroreflector-detector 12 is disposed opposite a first end of laser amplifier 10 and optically aligned therewith. Utilization means 13 is electrically coupled to the detector portion of retroreflector-detector 12 by means of an appropriate transmission line. Retroreflector-detector 12 can comprise, for example, one of the structures depicted in the copending application of G. J. Linford, A. R. Muir, E. R. Peressini and W. R. Sooy, Ser. No. 711,459, filed Mar. 7, 1968. In some instances utilization means 13 can comprise, for example, a headset either driven directly by the detector or through a simple amplifier stage. In other applications utilization means 13 can comprise amplification stages, video detectors or other multistage apparatus.

Disposed in the optical path opposite the other end of laser amplifier 10 is an optical loss modulator 14. Optical modulator 14 can comprise, for example, a Kerr cell or Pockell cell-polarizer combination or other suitable optical modulator well-known in the art. A modulator driver 15 suitable for the type of modulator utilized is electrically coupled thereto. Input means 16 are provided at modulator driver 15 for supplying thereto the modulating intelligence.

In the optical path on the side of the modulator 14 away from laser amplifier 10 are disposed first and second aligned reflecting members 17 and 18 which constitute an optical telescope. A remote retroreflector 19, located, for example, several kilometers from composite retroreflector-detector 12 comprises the other end of the long laser cavity. A photosensitive detector 20 is coupled to retroreflector 19 as is a modulator 21.

It should be noted that as used herein, the terms "light" and "optical" are generalized to indicate those portions of the electromagnetic wave spectrum which include the infrared, visible and ultraviolet regions. In fact, a preferred embodiment utilizing xenon gas as the active laser medium provides an output in the infrared region at approximately 3.5 microns.

In practice, retroreflector 19 can comprise a reflective corner cube of the type having three mutually perpendicular reflecting surfaces. A structure suitable for such use is described in the U.S. Pat. No. Re. 26,548, granted to N. E. Thomas on Mar. 25, 1969. An aperture can be provided in one or more of the reflecting surfaces behind which the photosensitive detector 20 is disposed. As described in the above-mentioned reissue patent, one of the reflecting surfaces of the corner cube can be in the form of a flexible membrane which, when set into vibration by an acoustical signal, modulates the reflection coefficient of the corner cube.

In operation, the active laser medium of high gain laser amplifier 10 is pumped by means of pumping source 11 to its inverted energy level. The optical feedback path necessary for sustained laser oscillation comprises retroreflector-detector 12, remote retroreflector 19, as well as the intervening optical components. Since, in general, all of the components with the exception of the remote components associated with retroreflector 19 are located at a first transmitting position, the feedback path is realized by merely bringing the remote retroreflector 19 into substantial optical alignment with the rest of the system.

If retroreflector 19 lies within a solid angle $\Omega$ with respect to laser amplifier 10, and if laser amplifier 10 has sufficient gain to overcome the optical loss of the round trip optical feedback path, laser oscillation will occur. The laser oscillation only occurs, however, after remote retroreflector 19 has been "acquired." Once oscillation begins, however, the solid angle over which it occurs is given by $\omega$, which can be very much less than $\Omega$.

To facilitate initial alignment of the receiving retroreflector 19, it is possible to employ a mechanical beam scanning arrangement at the transmitting location. Such an arrangement is described in the copending application of E. R. Peressini and W. R. Sooy, Ser. No. 729,497, filed May 13, 1968.

As indicated, the laser communications link of the present invention is highly resistant to unauthorized detection. The high degree of security afforded by this system is due primarily to the fact that the remote retroreflector must be aligned in the optical field of view of the transmitting station before any significant radiation is transmitted. That is, unless a receiving retroreflector is present and aligned the laser amplifier emits only negligible "flourescent" radiation. This is unlike other prior art laser communications systems such as that described in the above-mentioned U.S. Pat. No. Re. 26,548 wherein the laser beam is continuously transmitted whether the receiving retroreflector is present or not.

As mentioned above, the field of view of the laser transmitter is indicated by the solid angle $\Omega$. If remote retroreflector 19 is located anywhere within this solid angle even though it is off of the so-called boresight of the transmitter, laser oscillation will take place. The large solid angle $\Omega$ has been referred to as the geometric "look angle" of the laser amplifier as modified by the recollimating optics. The angle over which the laser oscillation will actually take place once the remote receiving retroreflector is acquired corresponds to the solid angle $\omega$. The small angle $\omega$ is a far field solid angle determined by the diffraction or medium scattering characteristics of laser amplifier 10, again modified by the recollimating optics. The so-called "enhancement factor" or ratio $\Omega/\omega$ can be on the order of $10^2$ to $10^3$.

Returning to the operation of the embodiment of FIG. 1, once the laser oscillation within the long laser cavity is established it is possible to modulate the light beam from either end. For modulating at the transmitting end, the loss modulator 14 and modulator driver 15 are utilized. At the receiving end the modulation component is extracted from the optical carrier by detector 20 and coupled as an output signal to a utilization device, not shown. Communication in the reverse direction is accomplished by means of modulator 21 coupled to retroreflector 19, the detector portion of retroreflector-detector 12, and utilization means 13.

It is obvious, of course, that the embodiment of FIG. 1 is intended solely for the purpose of illustration and that other arrangements of components can be made. Some of the other possible structures are described in connection with the embodiments of FIGS. 2 and 3. Briefly, however, these modifications can include the use of gain modulation instead of loss modulation; the use of detectors which are mounted separately from the retroreflector structures and the use of different recollimating optics and beam scanning arrangements.

Figure 2:
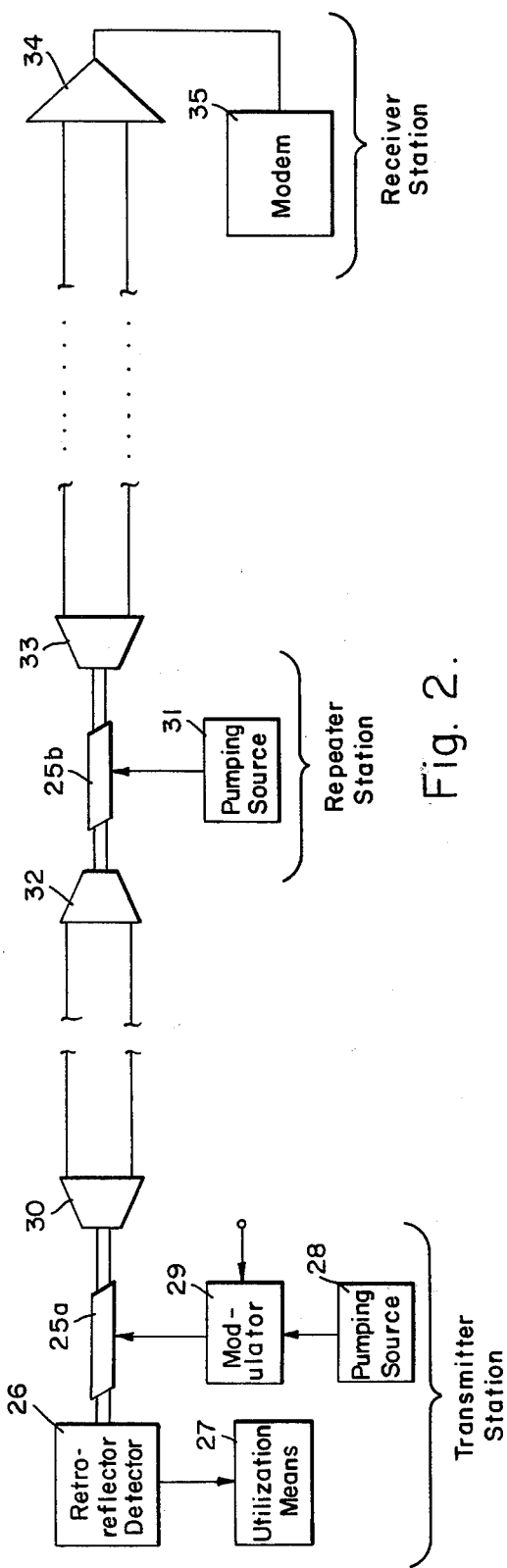
FIG. 2 is a block diagram of another embodiment of the present invention utilizing an intermediate repeater station.

An embodiment of the present invention which is suitable for very long transmission paths is depicted in the block diagram of FIG. 2. In FIG. 2 a plurality of high gain laser amplifiers 25a, 25b, . . . are disposed between the retroreflectors which define the ends of a single long laser cavity. As in the embodiment of FIG. 1, retroreflector 26 is shown as a combined retroreflector-detector. Also, as before, the detector portion of retroreflector-detector 26 is coupled to utilization means 27 by a suitable transmission line.

Associated with laser amplifier 25a at the transmitting station is a pumping source 28 and modulator 29. Intelligence bearing input signals are applied to modulator 29 which, in turn, varies the amount of pumping power to laser amplifier 25a. This type of modulation is broadly termed "gain modulation" and can be employed - in fact may be preferable in some instances - to the loss modulator arrangement of FIG. 1. Also, at the transmitting station and optically aligned with the second end of laser amplifier 25a, there is shown recollimating optical means 30. Recollimating optical means 30 can comprise, for example, a telescope such as that shown in the embodiment of FIG. 1.

A second or repeater station is located some distance from the transmitting station and comprises laser amplifier 25b, its pumping source 31 and the input and output recollimating means 32 and 33. Although the repeater station serves a function similar to a repeater station of a microwave transmission system, there are obvious dissimilarities between the present arrangement and a microwave repeater station and, therefore, the analogy is only approximate. In addition to the relative simplicity of the present repeater compared to those utilized in microwave applications it is apparent the laser repeater is not functional unless the laser cavity retroreflectors are aligned and the total gain provided by laser amplifiers 25a, 25b, . . . is adequate to overcome the transmission loss of the complete round trip transmission path. Conventional microwave repeaters, on the other hand, generally provide output carrier signals even in the absence of modulation or in the absence of transmitting and receiving stations.

The dotted transmission path between recollimating means 33 and remote retrodirective-reflector 34 indicates the position of possible intermediate repeater stations. The number of repeater stations is determined by many factors, including the optical power available, the magnitude of the transmission loss, topography and degree of signal-to-noise ratio which can be tolerated.

Electrically coupled to remote retroreflector 34 is a combination modulator-demodulator (modem) 35. Modem 35 serves the dual function of extracting the modulation content from the laser carrier and for modulating the laser carrier at the remote receiving station.

The operation of the embodiment of FIG. 2 is basically the same as that of FIG. 1. That is, a single long laser cavity is defined by the alignment of retroreflector-detector 26 and remote retroreflector 34. The intermediate high gain laser amplifiers 25b, etc., merely provide gain to compensate for the increased attenuation occasioned by the longer transmission path.

Figure 3:
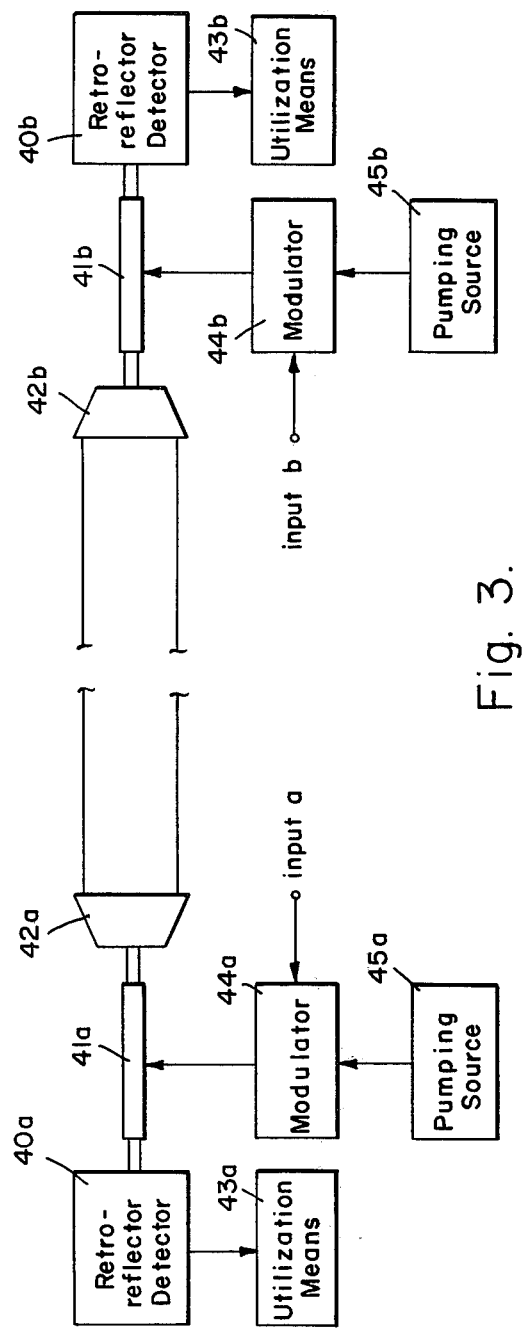
FIG. 3 is a block diagram of yet another embodiment of the present invention utilizing a laser amplifier at each end of the long laser cavity.

If highly portable remote receivers are not required, system improvement can be achieved by use of the embodiment of FIG. 3. In the embodiment of FIG. 3, high gain laser amplifiers are employed at both ends of the long laser cavity. This arrangement allows much longer range communication and more sophisticated modulation and demodulation apparatus.

In the embodiment of FIG. 3, first and second opposed composite retroreflector-detectors 40a and 40b define the ends of a long laser cavity. The broken-away center portion represents an extended transmission path which can also include one or more repeater stations such as indicated in FIG. 2. At the first location in the optical path between retroreflector-detectors 40a and 40b there is disposed a first high gain laser amplifier 41a and recollimating means 42a. At the second location a second high gain laser amplifier 41b and second recollimating means 42b are similarly disposed. Associated with each of the retroreflector-detectors 40a and 40b there is shown electrically coupled utilization means 43a and 43b, respectively. As in the embodiment of FIG. 2, high gain laser amplifiers 41a and 41b are gain modulated by means of modulators 44a and 44b which are electrically coupled between the pumping sources 45a and 45b and their associated laser amplifiers respectively.

The various embodiments of the present invention have been described in terms of their usefulness as communications systems. It is also possible to include as a part of the utilization means at the transmitting location, a frequency determining device for providing transmitter-to-receiver range information. A high-speed gated counter of a type commercially available, for example, can be utilized for this purpose. A complete description of this type of range measurement is contained in the above-mentioned copending application, Ser. No. 711,459, filed Mar. 7, 1968.

In all cases it is understood that the above-described embodiments are merely illustrative of but a small number of the many possible specific embodiments which can represent applications of the principles of the present invention. Numerous and varied other arrangements can be readily devised in accordance with these principles by those skilled in the art without departing from the spirit and scope of the invention.

What is claimed is:

1. A secure laser communications system comprising, in combination:
    a first optical retroreflector;
    a second optical retroreflector remotely disposed from and aligned with said first retroreflector;
    said first and second retroreflectors defining the ends of an optical cavity;
    at least one laser amplifier disposed adjacent said first retroreflector within said optical cavity, the gain of said laser amplifier being at least sufficient to sustain laser oscillation within said optical cavity;
    a first modulator coupled to said laser amplifier, said first modulator controlling the output of said laser amplifier in response to a first modulating signal;
    a second modulator coupled to said second retroreflector, said second modulator controlling the optical reflection coefficient of said second retroreflector in response to a second modulating signal; and
    first and second photodetectors, said first and second photodetectors being coupled to said first and second retroreflectors respectively.

2. The laser communications system according to claim 1, wherein said optical cavity further includes an optical recollimator disposed between said laser amplifier and said second retroreflector.

3. The laser communications system according to claim 1, including first and second utilization devices coupled to said first and second photodetectors, respectively.

4. The laser communications system according to claim 1, wherein said optical cavity further includes at least one intermediate repeater laser amplifier.

5. A secure laser communications system comprising, in combination:
    a first optical retroreflector;
    a second optical retroreflector remotely disposed from and aligned with said first retroreflector;
    said first and second retroreflectors defining the ends of an optical cavity;
    first and second laser amplifiers respectively disposed adjacent said first and second retroreflectors within said optical cavity, the combined gains of said first and second laser amplifiers being at least sufficient to sustain laser oscillation within said optical cavity;
    first and second modulator means coupled to said first and second laser amplifiers respectively, said first and second modulator means controlling the respective outputs of said laser amplifiers in response to first and second modulating signals;
    first and second photodetectors, said first and second photodetectors being coupled to said first and second retroreflectors respectively; and first and second utilization devices coupled to the outputs of said first and second photodetectors, respectively.

6. The laser communications system according to claim 5, wherein said optical cavity further includes an optical recollimator disposed between said first and second laser amplifiers.

7. The laser communications system according to claim 5, wherein said optical cavity further includes at least one intermediate repeater laser amplifier.

* * * * *